US012020680B2

(12) United States Patent
Imaizumi et al.

(10) Patent No.: US 12,020,680 B2
(45) Date of Patent: Jun. 25, 2024

(54) SOUND IMAGE LOCALIZATION DEVICE, SOUND IMAGE LOCALIZATION METHOD, AND PROGRAM

(71) Applicant: Nippon Telegraph and Telephone Corporation, Tokyo (JP)

(72) Inventors: Kenta Imaizumi, Musashino (JP); Kimitaka Tsutsumi, Musashino (JP); Atsushi Nakadaira, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 356 days.

(21) Appl. No.: 17/600,969

(22) PCT Filed: Mar. 19, 2020

(86) PCT No.: PCT/JP2020/012353

§ 371 (c)(1),
(2) Date: Oct. 1, 2021

(87) PCT Pub. No.: WO2020/203358

PCT Pub. Date: Oct. 8, 2020

(65) Prior Publication Data

US 2022/0157292 A1 May 19, 2022

(30) Foreign Application Priority Data

Apr. 4, 2019 (JP) ................................ 2019-072042

(51) Int. Cl.
*G10K 11/28* (2006.01)
*G10K 11/34* (2006.01)
*H04R 3/12* (2006.01)

(52) U.S. Cl.
CPC .............. *G10K 11/28* (2013.01); *G10K 11/34* (2013.01); *H04R 3/12* (2013.01)

(58) Field of Classification Search
None
See application file for complete search history.

(56) References Cited

U.S. PATENT DOCUMENTS

2014/0126753 A1* 5/2014 Takumai ................ H04S 7/305 381/303

FOREIGN PATENT DOCUMENTS

JP 2012008156 1/2012
JP 2012169895 A * 9/2012 ............... H04R 3/12

OTHER PUBLICATIONS

Sakamoto et al., "Sound Localization of Beamforming-Controlled Reflected Sound from Ceiling in Presence of Direct Sound," 144th Audio Engineering Society Convention Paper, May 23, 2018, 7 pages.

* cited by examiner

*Primary Examiner* — Walter F Briney, III
(74) *Attorney, Agent, or Firm* — Fish & Richardson P.C.

(57) ABSTRACT

Provided is a sound image localization device capable of flexibly controlling directivity with a short calculation time. A sound image localization device that reflects, on a reflector 50, a sound signal radiated from a speaker array 40 arranged with a plurality of speakers $SP_1$ to $SP_Q$ on a straight line to localize a sound image includes an expansion coefficient calculation unit 10 configured to analytically calculate expansion coefficients by performing a spherical harmonic function expansion on a window function representing desired directivity, a filter coefficient generation unit 20 configured to convert the expansion coefficients into filter coefficients corresponding to each of the speakers $SP_1$ to $SP_Q$, and a speaker drive unit 30 configured to generate a speaker drive signal for driving each of the speakers $SP_1$ to $SP_Q$ by convolving the filter coefficients in a voice signal.

17 Claims, 7 Drawing Sheets

(a)

(b)

SOUND IMAGE LOCALIZATION DEVICE, SOUND IMAGE LOCALIZATION METHOD, AND PROGRAM

CROSS-REFERENCE TO RELATED APPLICATIONS

This application is a National Stage application under 35 U.S.C. § 371 of International Application No. PCT/JP2020/012353, having an International Filing Date of Mar. 19, 2020, which claims priority to Japanese Application Serial No. 2019-072042, filed on Apr. 4, 2019. The disclosure of the prior application is considered part of the disclosure of this application, and is incorporated in its entirety into this application.

TECHNICAL FIELD

The present invention relates to a sound image localization device, a sound image localization method, and a program, and more particularly to a sound reproduction technique having a presentment effect of generating a virtual sound source at any position instead of a main body of a speaker.

BACKGROUND ART

Recently, in public viewing and at home, a reproduction method has widely used in which a plurality of speakers are arranged. In addition, as video techniques such as 3D video and wide video have spread, measures have been taken to realize a sound reproduction with a higher sense of presence by generation of a virtual sound source at any position instead of a main body of a speaker.

As a sound reproduction technique that creates a virtual speaker using sound reflection, for example, Patent Literature 1 discloses a method of controlling directivity such that the sum of sound radiated from a directivity speaker and sound reflected from a reflector is maximized at any point to realize local reproduction. In addition, for example, Non-Patent Literature 1 discloses a method of reflecting sound on a ceiling due to directivity reproduction of a regular polyhedron speaker to realize upward sound image localization.

As reported from Non-Patent Literature 1, a sound image can be localized upward when a difference between sound reflected from the ceiling and direct sound from the speaker is larger than 5 dB. In order for a plurality of people to perceive that the sound image exists upward, it is necessary to control directivity of the reproduction sound in any form.

CITATION LIST

Patent Literature

Patent Literature 1: Japanese Patent Laid-Open No. 2012-8156

Non-Patent Literature

Non-Patent Literature 1: H. Sakamoto, Y. Haneda, "Sound Localization of Beamforming-Controlled Reflected Sound from Ceiling in Presence of Direct Sound," in 144th Audio Engineering Society Convention paper 9949, 2018, May.

SUMMARY OF THE INVENTION

Technical Problem

However, according to the conventional directivity control, there are problems that many control points need to be used to flexibly change the directivity and a long calculation time is required.

The present invention has been made in view of the problems, and an object thereof is to provide a sound image localization device, a sound image localization method, and a program capable of flexibly controlling directivity with a short calculation time.

Means for Solving the Problem

As the gist, a sound image localization device according to an aspect of the present invention is a sound image localization device that reflects, on a reflector, a sound signal radiated from a speaker array arranged with a plurality of speakers on a straight line to localize a sound image, the sound image localization device including: an expansion coefficient calculation unit configured to analytically calculate expansion coefficients by performing a spherical harmonic function expansion on a window function representing desired directivity; a filter coefficient generation unit configured to convert the expansion coefficients into filter coefficients corresponding to each of the speakers; and a speaker drive unit configured to generate a speaker drive signal for driving each of the speakers by convolving the filter coefficients in a voice signal.

As the gist, a sound image localization method according to another aspect of the present invention is a sound image localization method to be executed by the sound image localization device that reflects, on a reflector, a sound signal radiated from a speaker array arranged with a plurality of speakers on a straight line to localize a sound image, the sound image localization method including: an expansion coefficient calculation step of analytically calculating expansion coefficients by performing a spherical harmonic function expansion on a window function representing desired directivity; a filter coefficient generation step of generating filter coefficients corresponding to each of the speakers from the expansion coefficients; and a speaker drive step of generating a speaker drive signal for driving each of the speakers by convolving the filter coefficients in a voice signal.

As the gist, a program according to further another aspect of the present invention is a program for causing a computer to function as the sound image localization device.

Effects of the Invention

According to the present invention, it is possible to provide a sound image localization device, a sound image localization method, and a program capable of flexibly controlling directivity with a short calculation time.

DESCRIPTION OF EMBODIMENTS

Figure 1:
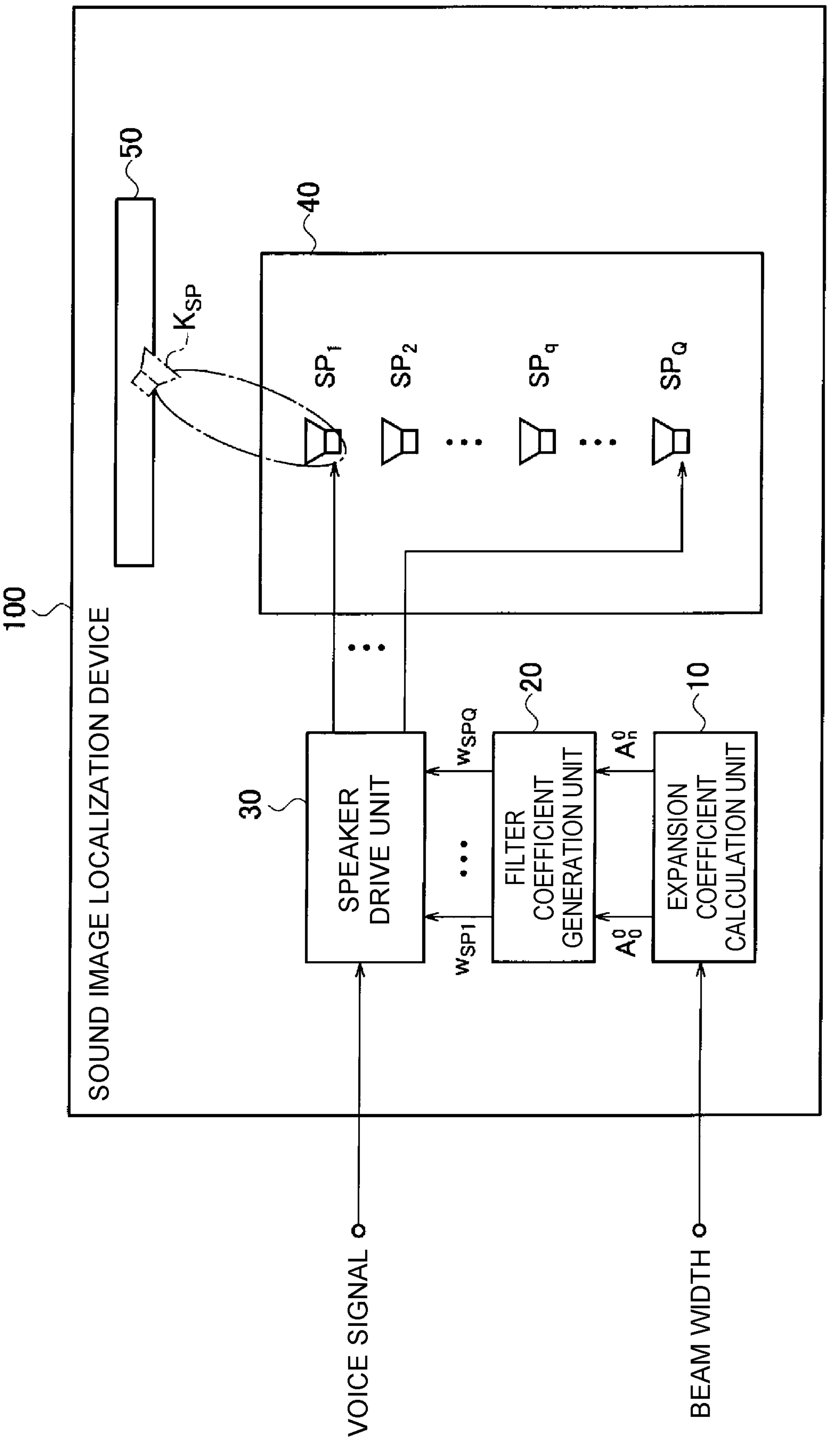
FIG. 1 is a block diagram showing a configuration example of a sound image localization device according to an embodiment of the present invention.

Embodiments of the present invention will be described below with reference to the drawings. In the plurality of drawings, the same components are denoted by the same reference numerals, and will not be repeatedly described.

FIG. 1 is a block diagram showing a configuration example of a sound image localization device according to an embodiment of the present invention.

A sound image localization device 100 shown in FIG. 1 analytically derives an expansion coefficient of a virtual speaker by performing a spherical harmonic function expansion on a window function having an arbitrary window width instead of arranging control points as in conventional directivity control, and reproduces the spherical harmonic function by a multi-pole sound source with a linear speaker array. According to such a method, it is possible to generate a sound beam in an end-fire direction with a short calculation time in such a manner that a beam width can be flexibly controlled, thereby forming a virtual speaker, and to present a sound image to a plurality of listeners. The end-fire direction is a direction along an axis of a one-dimensional array.

Figure 2:
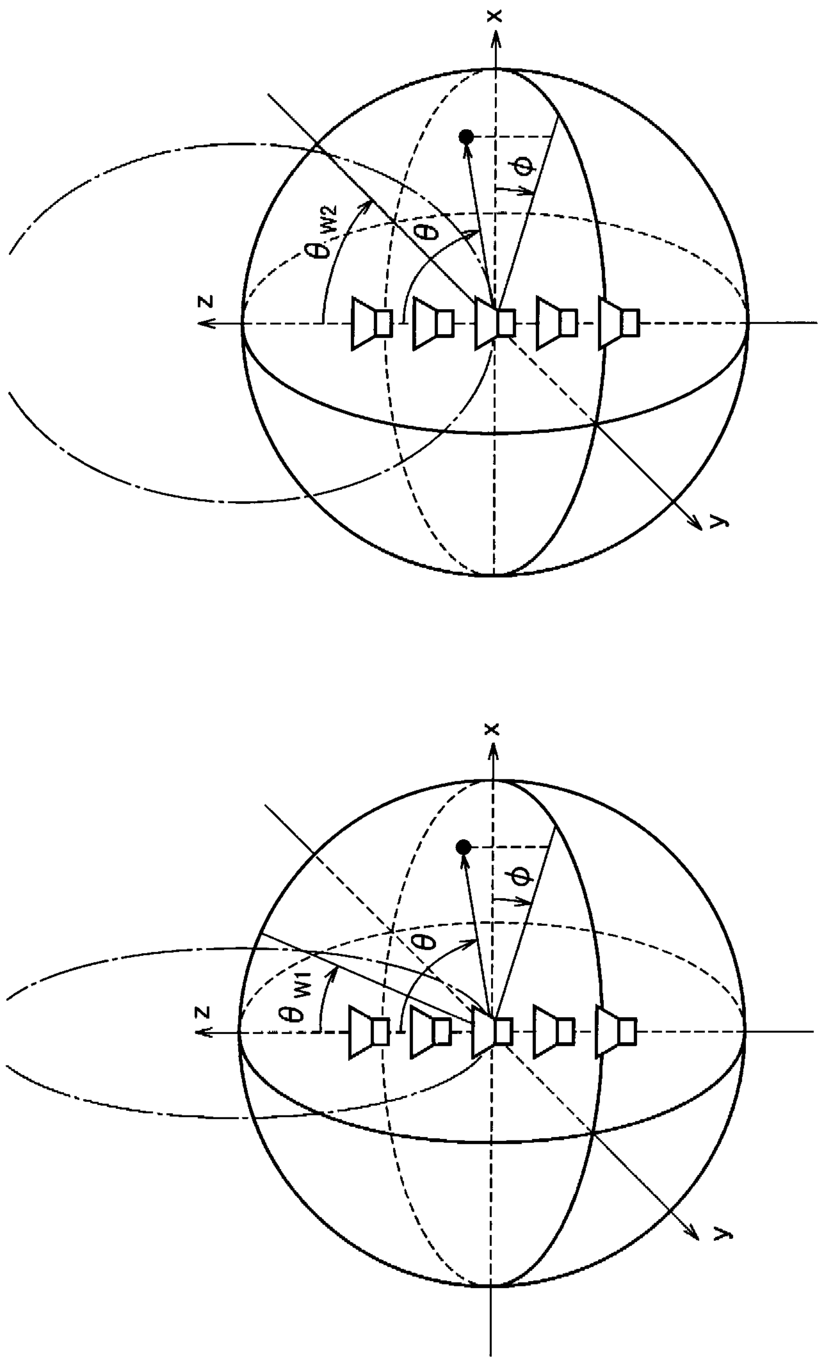
FIG. 2 is a view schematically showing a sound beam in an end-fire direction.

FIG. 2 is a view schematically showing a sound beam in the end-fire direction. FIGS. 2(*a*) and 2(*b*) schematically shows a difference in a width of a sound beam. In FIG. 2(*a*), the width of the sound beam is narrow. In FIG. 2(*b*), the width of the sound beam is wide. The sound image localization device 100 according to the embodiment realizes control of the width of the sound beam shown in FIG. 2 without providing many control points as in the conventional case.

As shown in FIG. 1, the sound image localization device 100 according to the embodiment includes an expansion coefficient calculation unit 10, a filter coefficient generation unit 20, a speaker drive unit 30, a speaker array 40, and a reflector 50. The sound image localization device 100 excluding the speaker array 40 and the reflector 50 can be realized by, for example, a computer including a ROM, a RAM, and a CPU. In such a case, a content of a function to be processed by the sound image localization device 100 is described by a program. The speaker array 40 shows an example in which a plurality of speakers $SP_1$ to $SP_Q$ are arranged on a straight line.

The expansion coefficient calculation unit 10 analytically calculates an expansion coefficient by performing a spherical harmonic function expansion on a window function representing desired directivity. The desired directivity is given from the outside by a beam width $\theta_\omega$ ($0<\theta_\omega\leq\pi$).

The window function will be described by taking a cosine window (Expression (1)) as an example. An example of another window function includes a rectangular window.

[Math. 1]

$$d(\theta)=\begin{cases}\cos\left(\frac{\pi}{2\theta_w}\theta\right), & \text{for } 0\leq\theta\leq\theta_w\\ 0, & \text{elsewhere}\end{cases} \tag{1}$$

(Spherical Harmonic Function)

Figure 3:
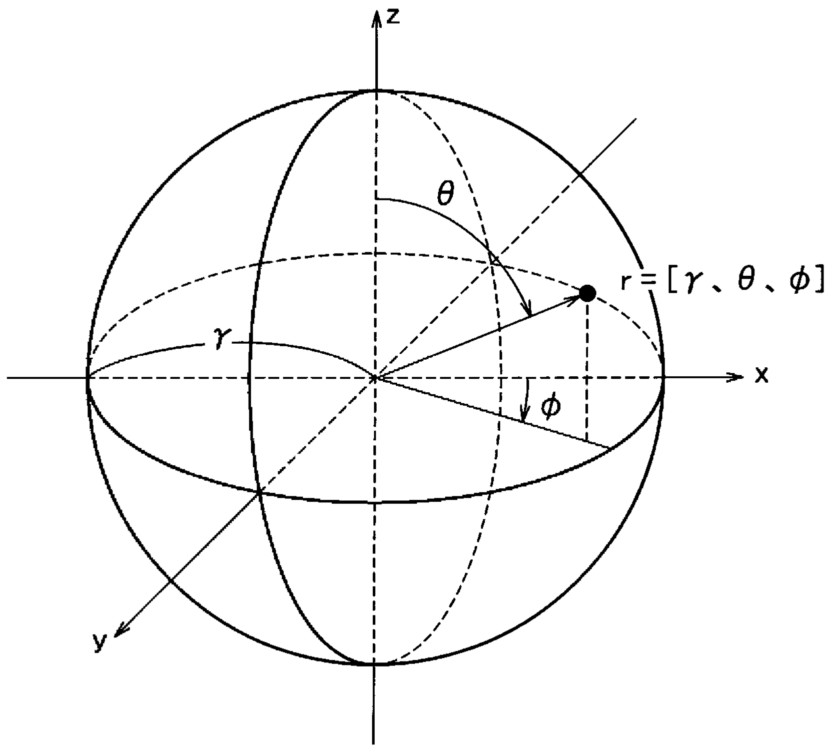
FIG. 3 is a view showing a polar coordinate system.

Here, a polar coordinate system shown in FIG. 3 is considered. In this case, a sound pressure $S(r, \theta, \phi, \omega)$ observed at any point on a sphere can be expressed by the following expression.

[Math. 2]

$$S(r,\theta,\phi,\omega)=\sum_{n=0}^{\infty}A_n^m(\omega)Y_n^m(\theta,\phi). \tag{2}$$

Here, $Y^m_n(\theta, \phi)$ represents a spherical harmonic function, and $A^m_n(\omega)$ represents an expansion coefficient thereof, which can be expressed by the following expression, respectively.

[Math. 3]

$$Y_n^m(\theta,\phi)=\sqrt{\frac{2n+1}{4\pi}\frac{(n-m)!}{(n+m)!}}P_n^m(\cos\theta)e^{jm\phi}, \tag{3}$$

$$A_n^m(\omega)=\int_0^{2\pi}\int_0^{\pi}S(r,\theta,\phi,\omega)Y_n^m(\theta,\phi)^*\sin\theta d\phi d\theta. \tag{4}$$

Here, Pmn(•) represents an associated Legendre function, and Expression (4) is called a spherical harmonic function expansion.

Figure 4:
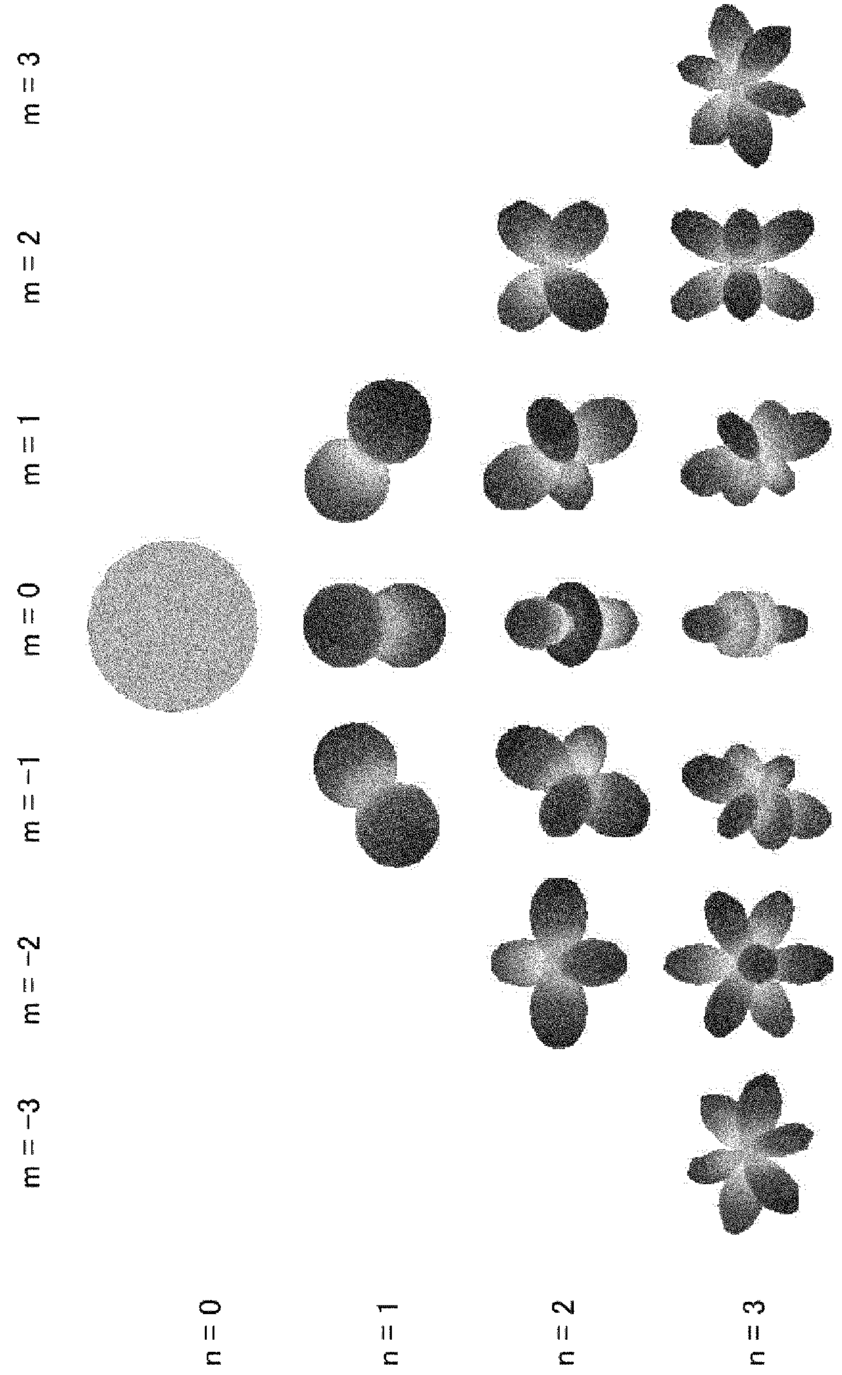
FIG. 4 is a view schematically showing an example of a spherical harmonic function for degrees up to n=3.

FIG. 4 is a view schematically showing an example of a spherical harmonic function for degrees up to n=3. A case where an order m is 0 or more indicates a real part, and a case where the order m is less than 0 indicates an imaginary part.

When a spherical harmonic function expansion is performed in a state where a desired characteristic $d(\theta)$ modeled in Expression (1) is substituted into $S(r,\theta,\phi,\omega)$ of Expression (2) and the order m of the spherical harmonic function is set to 0, an expansion coefficient $A^0_n$ corresponding to the multi-pole sound source can be obtained.

[Math. 4]

$$\begin{aligned}A_n^0&=\int_0^{2\pi}\int_0^{\theta_w}\cos\left(\frac{\pi}{2\theta_w}\theta\right)Y_n^0(\theta,\phi)^*\sin\theta d\phi d\theta\\&=2\pi\sqrt{\frac{2n+1}{4\pi}}\int_0^{\theta_w}\cos\left(\frac{\pi}{2\theta_w}\theta\right)P_n(\cos\theta)\sin\theta d\theta\end{aligned} \tag{5}$$

An expansion coefficient for degrees up to n=2 are shown below.

[Math. 5]

$$\begin{aligned}A_0^0&=2\pi\sqrt{\frac{1}{4\pi}}\int_0^{\theta_w}\cos\left(\frac{\pi}{2\theta_w}\theta\right)P_0(\cos\theta)\sin\theta d\theta\\&=\frac{\sqrt{\pi}}{2}\left(\frac{1+\sin\theta_w}{\frac{\pi}{2\theta_w}+1}-\frac{1-\sin\theta_w}{\frac{\pi}{2\theta_w}-1}\right)\end{aligned} \tag{6}$$

-continued $$A_1^0 = 2\pi\sqrt{\frac{3}{4\pi}}\int_0^{\theta_w}\cos\left(\frac{\pi}{2\theta_w}\theta\right)P_1(\cos\theta)\sin\theta d\theta = \frac{\sqrt{3}\pi}{4}\left(\frac{1+\sin 2\theta_w}{\frac{\pi}{2\theta_w}+2} - \frac{1-\sin 2\theta_w}{\frac{\pi}{2\theta_w}-2}\right) \quad (7)$$

$$A_2^0 = 2\pi\sqrt{\frac{5}{4\pi}}\int_0^{\theta_w}\cos\left(\frac{\pi}{2\theta_w}\theta\right)P_1(\cos\theta)\sin\theta d\theta = \frac{\sqrt{5}\pi}{16}\left(3\frac{1+\sin 3\theta_w}{\frac{\pi}{2\theta_w}+3} - 3\frac{1-\sin 3\theta_w}{\frac{\pi}{2\theta_w}-3} - \frac{1+\sin\theta_w}{\frac{\pi}{2\theta_w}+1} + \frac{1-\sin\theta_w}{\frac{\pi}{2\theta_w}-1}\right) \quad (8)$$

An expansion coefficient can be analytically derived for degrees after n=2 as well.

The filter coefficient generation unit 20 generates a filter coefficient corresponding to each of the speakers forming the speaker array 40 from the expansion coefficient $A^m_n$ by the following expression (step S2 (FIG. 2)).

(Directivity Control Technology Using Multi-Pole Sound Source)

A method is known in which desired directivity is developed by a spherical harmonic function and the obtained expansion coefficient $A^0_n$ is applied to a multi-pole sound source to form directivity (for example, Reference Literature: Yoichi HANEDA et al., "Directivity synthesis using multipole sources based on spherical harmonic function expansion", The Journal of the Acoustical Society of Japan, 69.11, 2013, 577-588).

The multi-pole sound source is a sound source in which point sound sources having the same amplitude are distributed in anti-phases as positions as close as possible to the origin. For example, when point sound sources are arranged at minute distances d in a z-axis direction, a sound pressure distribution $M^0_n(r,\theta,\phi,\omega)$ of the multi-pole sound source can be expressed by the following expression.

[Math. 6]

$$M_n^0(r,\theta,\phi,\omega) = Qd^n\frac{\partial^n}{\partial z^n}\left(\frac{e^{jkr}}{4\pi r}\right) \approx Q(jkd)^n\frac{e^{jkr}}{4\pi r}Z^n. \quad (9)$$

The approximation is z=cos θ established when 1<<kr. A symbol Q represents an intensity of the point sound source. A symbol k represents a wavenumber (k=ω/c). In addition, the multi-pole sound source has directivity very similar to the spherical harmonic function, and the speaker array 40 arranged in the z-axis direction can reproduce directivity similar to the spherical harmonic function when the order m is 0.

In other words, the application to the multi-pole sound source can be expressed by the following expression.

[Math. 7]

$$S(r,\theta,\phi,\omega) = \sum_{n=0}^{\infty}A_n^m(\omega)M_n^m(\theta,\phi,\omega). \quad (10)$$

The filter coefficient generation unit 20 generates a filter coefficient w(ω) by multiplying each expansion coefficient $A^m_n$ by a corresponding weight $D^0_n(\omega)$ of each of the speakers when the spherical harmonic functions are reproduced by the speakers $SP_1$ to $SP_Q$ (Expression (11)).

[Math. 8]

$$w(\omega) = \sum_{n=0}^{\infty}A_n^0D_n^0(\omega) \quad (11)$$

The weight $D^0_n(\omega)$ can be expressed by the following expression when the number of speakers corresponding to the spherical harmonic functions for the degrees up to n=2 is five, for example.

[Math. 9]

$$D_0^0(\omega) = \sqrt{\frac{1}{4\pi}}\cdot\begin{bmatrix}0\\0\\1\\0\\0\end{bmatrix},\ D_1^0(\omega) = \sqrt{\frac{3}{4\pi}}\cdot\begin{bmatrix}0\\j/2kd\\0\\-j/2kd\\0\end{bmatrix}, \quad (12)$$

$$D_2^0(\omega) = \sqrt{\frac{5}{16\pi}}\cdot\begin{bmatrix}0\\-3/k^2d^2\\6/k^2d^2-1\\-3/k^2d^2\\0\end{bmatrix}$$

Here, a symbol d represents a distance between the speakers $SP_1$ to $SP_Q$ (the above-described minute distance). In addition, a symbol k represents the wavenumber (k=ω/c), and a symbol c represents a speed of light.

The speaker drive unit convolves the filter coefficient w(ω) in the voice signal input from the outside to generate speaker drive signals for driving the speakers $SP_1$ to $SP_Q$, respectively. As is clear from Expression (12), the speaker drive signal for degree n=0 is input only to the speaker SP3 with $A^0_n(1/4\pi)^{0.5}$. The speaker drive signal for degree n=1 is input to the speakers $SP_2$ and $SP_4$. The speaker drive signal for degree n=2 is input to the speakers $SP_2$, $SP_3$, and $SP_4$.

When such speaker drive signals are input to the speaker array 40, a sound signal corresponding to the desired directivity can be reproduced.

As described above, the sound image localization device 100 according to the embodiment is a sound image localization device that reflects, on the reflector 50, the sound signal radiated from the speaker array 40 arranged with the plurality of speakers in the straight line to localize the sound image, and includes the expansion coefficient calculation unit 10, the filter coefficient generation unit 20, and the speaker drive unit 30. The expansion coefficient calculation unit 10 performs the spherical harmonic function expansion on the window function indicating the desired directivity to analytically calculate the expansion coefficient. The filter coefficient generation unit 20 generates, from the expansion coefficient $A^m_n$, the filter coefficient w(ω) corresponding to each of the speakers $SP_1$ to $SP_Q$. The speaker drive unit 30 convolves the filter coefficient w(ω) in the voice signal to generate the speaker drive signals for driving the speakers $SP_1$ to $SP_Q$, respectively.

Thus, it is possible to provide the sound image localization device 100 that can flexibly control the directivity with a short calculation time.

(Sound Image Localization Method)

A sound image localization method executed by the sound image localization device 100 will be described below.

Figure 5:
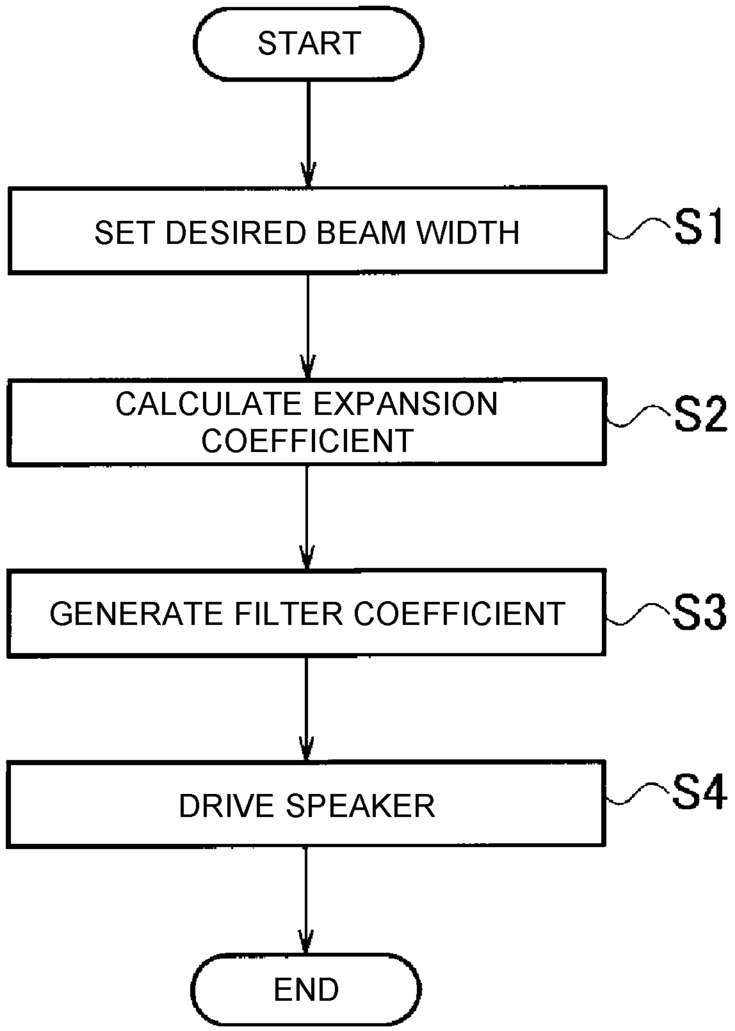
FIG. 5 is a flowchart showing a processing procedure to be executed by the sound image localization device shown in FIG. 1.

FIG. 5 is a flowchart showing a processing procedure executed by the sound image localization device 100.

First, the sound image localization device 100 is set with a beam width representing desired directivity (step S1). The beam width $\theta_w$ (Expression (1)) is input to the expansion coefficient calculation unit 10 from the outside (step S1).

Next, the expansion coefficient calculation unit 10 performs the spherical harmonic function expansion on the window function representing the desired directivity d(θ) to analytically calculate the expansion coefficient $A^m_n$ (step S2).

Next, the filter coefficient generation unit 20 generates a filter coefficient w(ω) corresponding to each of the speakers $SP_1$ to $SP_Q$ forming the speaker array 40 from the expansion coefficient $A^m_n$ (step S3). The filter coefficient generation unit 20 generates a filter coefficient w(ω) by multiplying each expansion coefficient $A^m_n$ by a corresponding weight $D^0_n(\omega)$ of each of the speakers $SP_1$ to $SP_Q$ when the spherical harmonic functions are reproduced by the speakers $SP_1$ to $SP_Q$ (Expression (11)).

The speaker drive unit 30 convolves the filter coefficient w(ω) in the voice signal input from the outside to generate speaker drive signals for driving the speakers $SP_1$ to $SP_Q$, respectively (step S4).

As described above, the sound image localization method according to the embodiment is a sound image localization method to be executed by the sound image localization device 100 that reflects, on the reflector 50, the sound signal radiated from the speaker array 40 arranged with the plurality of speakers $SP_1$ to $SP_Q$ on the straight line to localize the sound image. The sound image localization method according to the embodiment includes: expansion coefficient calculation step S2 of analytically calculating expansion coefficients $A^m_n$ by performing a spherical harmonic function expansion on a window function representing desired directivity; filter coefficient generation step S3 of generating filter coefficients w(ω) corresponding to each of the speakers $SP_1$ to $SP_Q$ from the expansion coefficients $A^m_n$; and speaker drive step S4 of generating a speaker drive signal for driving each of the speakers $SP_1$ to $SP_Q$ by convolving the filter coefficients w(ω) in a voice signal. Thus, it is possible to provide the sound image localization method capable of flexibly controlling the directivity with a short calculation time.

Figure 6:
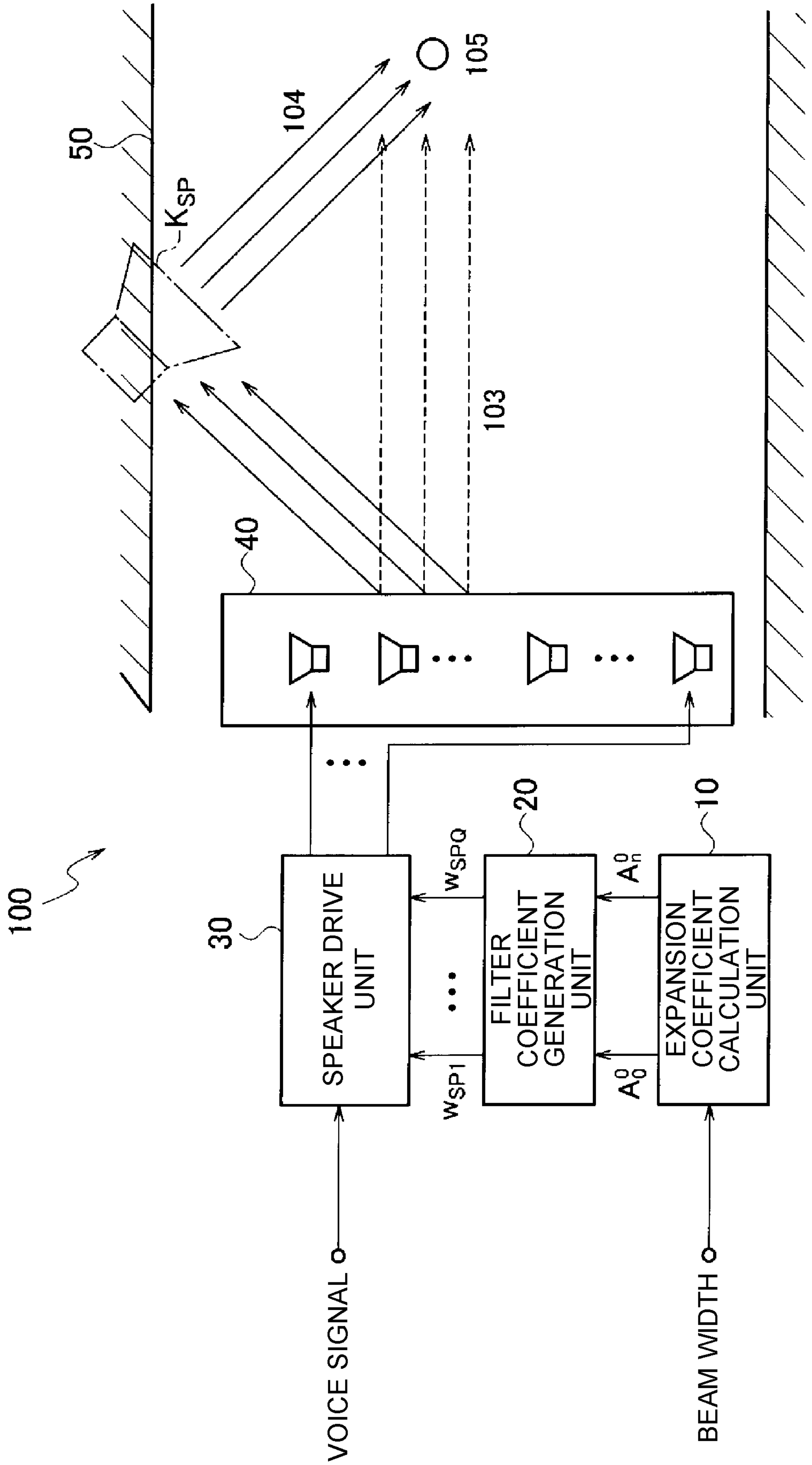
FIG. 6 is a view schematically showing a state of sound image localization provided by the sound image localization device shown in FIG. 1.

FIG. 6 is a view schematically showing a state of sound image localization provided by the sound image localization device 100 and the sound image localization method according to the embodiment. As shown in FIG. 6, the sound image localization device 100 radiates the sound signals to the reflector 50 (for example, a ceiling) to realize upward sound image localization (a virtual speaker $K_{SP}$).

Reference numeral 103 indicates a direct sound, reference numeral 104 indicates a reflected sound, and reference numeral 105 indicates a listening point. According to the sound image localization device 100, the listener located at the listening point 105 can perceive the upward sound image localization without using many control points.

Comparative Example

Figure 7:
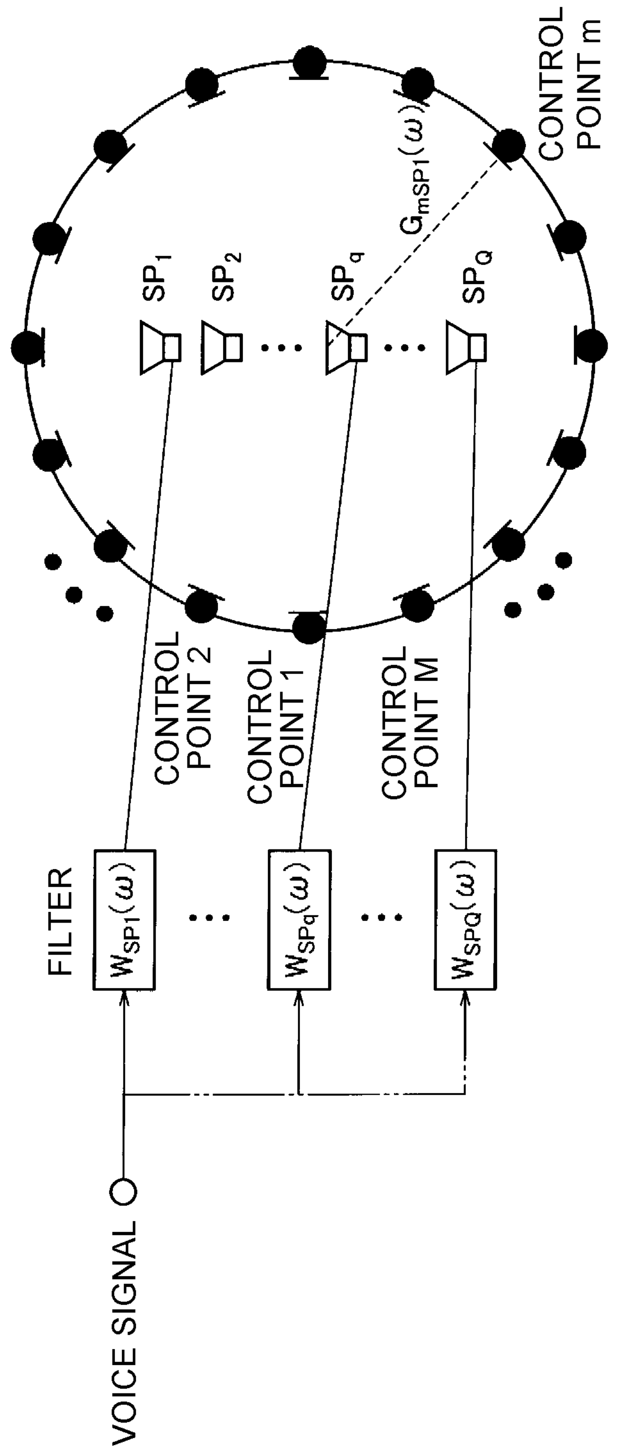
FIG. 7 is a view schematically showing an observation system at the time of designing a filter of directivity control by a least-squares method.

FIG. 7 is a view schematically showing an observation system when a filter for directivity control is designed by a least-squares method. Control points 1 to M annularly surround the speaker array 40 shown in FIG. 7.

From the directivity control by the least-squares method, a filter coefficient is obtained to minimize the sum of squares of an error between the desired directivity and the directivity observed at the control point. Accordingly, a calculation quantity increases. The directivity control by the least-squares method is well known, and thus will not be described by expressions.

Further, according to the method based on Non-Patent Literature 1, sound is reflected on the ceiling due to directivity reproduction of a regular polyhedron speaker and upward sound image localization is realized. In such a method, the directivity is formed using a normalized matched filter.

The normalized matched filter is obtained by providing a filter that matches the observed sound signal when the sound signal radiated from the speaker is observed at the observation point with the sound signal emitted by the speaker. Therefore, a transfer function to the target observation point is required for all of the speakers, resulting in an increase in calculation quantity.

In the sound image localization method according to the embodiment contrary to the comparative example, the expansion coefficient is analytically calculated by performing the spherical harmonic function expansion on the window function representing the desired directivity, and the filter coefficient corresponding to each of the speakers is generated from the expansion coefficient, thereby the calculation quantity can be reduced. In other words, it is possible to provide the sound image localization method capable of flexibly controlling the directivity with a short calculation time.

The characteristic function units of the sound image localization device 100 according to the embodiment can be realized by the computer including the ROM, the RAM, and the CPU. In such a case, the content of the function to be processed by each of the function units is described by the program. Such a program can be distributed via a recording medium such as a CD-ROM or a transmission medium such as the Internet.

It goes without saying that the present invention includes various embodiments and the like not described herein. Therefore, the technical scope of the present invention is defined only by the matters specifying the invention relating to the reasonable claims from the above description.

REFERENCE SIGNS LIST

10 Expansion coefficient calculation unit
20 Filter coefficient generation unit
30 Speaker drive unit
40 Speaker array
50 Reflector (ceiling)
100 Sound image localization device
103 Direct sound
104 Reflected sound
105 Listening point

The invention claimed is:

1. A sound image localization device that reflects, on a reflector, a sound signal radiated from a speaker array arranged with a plurality of speakers on a straight line to localize a sound image, the sound image localization device comprising:

an expansion coefficient calculation unit, including one or more processors, configured to analytically calculate expansion coefficients by performing a spherical harmonic function expansion on a window function representing desired directivity;

a filter coefficient generation unit, including one or more processors, configured to generate filter coefficients corresponding to each of the speakers from the expansion coefficients; and a speaker drive unit, including one or more processors, configured to generate a speaker drive signal for driving each of the speakers by convolving the filter coefficients in a voice signal, wherein the desired directivity is determined based on a beam width ranging from 0 to π, and wherein the window function includes one of a cosine window or a rectangular window.

2. The sound image localization device according to claim 1, wherein the cosine window is derived based on an equation as follow:

$$d(\theta) = \begin{cases} \cos\left(\frac{\pi}{2\theta_w}\theta\right), \\ 0, \end{cases}$$

3. The sound image localization device according to claim 1, wherein the spherical harmonic function expansion is performed based on a sound pressure.

4. The sound image localization device according to claim 3, wherein the sound pressure is derived based on an equation as follow:

$$S(r, \theta, \phi, \omega) = \sum_{n=0}^{\infty} A_n^m(\omega) Y_n^m(\theta, \phi).$$

5. The sound image localization device according to claim 3, wherein the sound pressure is observed at a point on a sphere.

6. The sound image localization device according to claim 1, wherein the filter coefficient generation unit is configured to generate the filter coefficient by multiplying each of the expansion coefficients by a corresponding weight of each of the speakers based on spherical harmonic functions being reproduced by the speakers.

7. A sound image localization method to be executed by a sound image localization device that reflects, on a reflector, a sound signal radiated from a speaker array arranged with a plurality of speakers on a straight line to localize a sound image, the sound image localization method comprising:

analytically calculating expansion coefficients by performing a spherical harmonic function expansion on a window function representing desired directivity;

generating filter coefficients corresponding to each of the speakers from the expansion coefficients; and generating a speaker drive signal for driving each of the speakers by convolving the filter coefficients in a voice signal, wherein the desired directivity is determined based on a beam width ranging from 0 to π, and wherein the window function includes one of a cosine window or a rectangular window.

8. The sound image localization method according to claim 7, wherein the cosine window is derived based on an equation as follow:

$$d(\theta) = \begin{cases} \cos\left(\frac{\pi}{2\theta_w}\theta\right), \\ 0, \end{cases}$$

9. The sound image localization method according to claim 7, wherein the spherical harmonic function expansion is performed based on a sound pressure.

10. The sound image localization method according to claim 9, wherein the sound pressure is derived based on an equation as follow:

$$S(r, \theta, \phi, \omega) = \sum_{n=0}^{\infty} A_n^m(\omega) Y_n^m(\theta, \phi).$$

11. The sound image localization method according to claim 9, wherein the sound pressure is observed at a point on a sphere.

12. A recording medium storing a program, wherein execution of the program causes one or more computers to perform operations comprising:

analytically calculating expansion coefficients by performing a spherical harmonic function expansion on a window function representing desired directivity;

generating filter coefficients corresponding to each of speakers from the expansion coefficients; and generating a speaker drive signal for driving each of the speakers by convolving the filter coefficients in a voice signal, wherein the desired directivity is determined based on a beam width ranging from 0 to π, and wherein the window function includes one of a cosine window or a rectangular window.

13. The recording medium according to claim 12, wherein generating the filter coefficients further comprises generating the filter coefficient by multiplying each of the expansion coefficients by a corresponding weight of each of the speakers based on spherical harmonic functions being reproduced by the speakers.

14. The recording medium according to claim 12, wherein the cosine window is derived based on an equation as follow:

$$d(\theta) = \begin{cases} \cos\left(\frac{\pi}{2\theta_w}\theta\right), \\ 0, \end{cases}$$

15. The recording medium according to claim 12, wherein the spherical harmonic function expansion is performed based on a sound pressure.

16. The recording medium according to claim 15, wherein the sound pressure is derived based on an equation as follow:

$$S(r, \theta, \phi, \omega) = \sum_{n=0}^{\infty} A_n^m(\omega) Y_n^m(\theta, \phi).$$

17. The recording medium according to claim 15, wherein the sound pressure is observed at a point on a sphere.

* * * * *